United States Patent Office 2,905,325
Patented Sept. 22, 1959

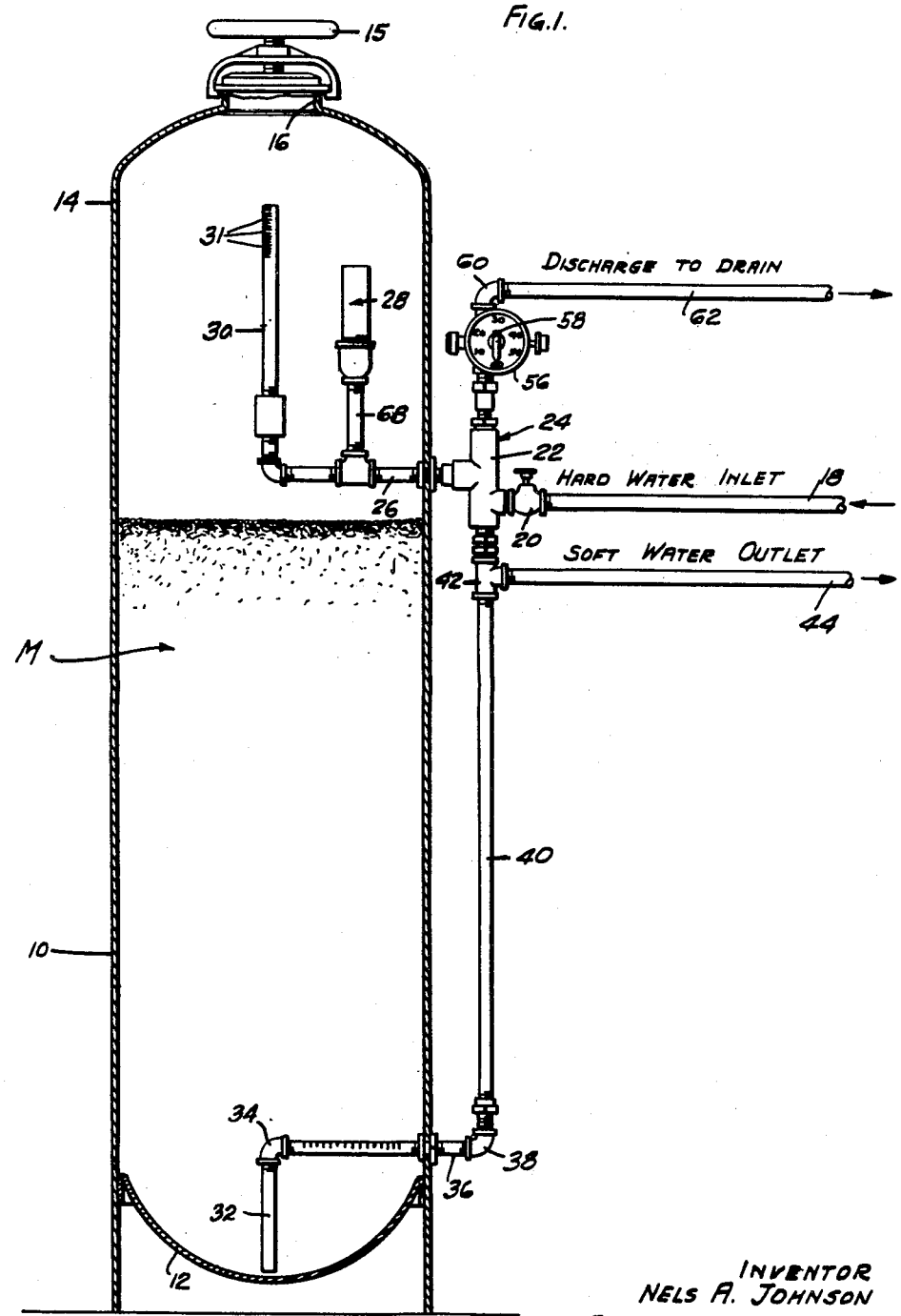

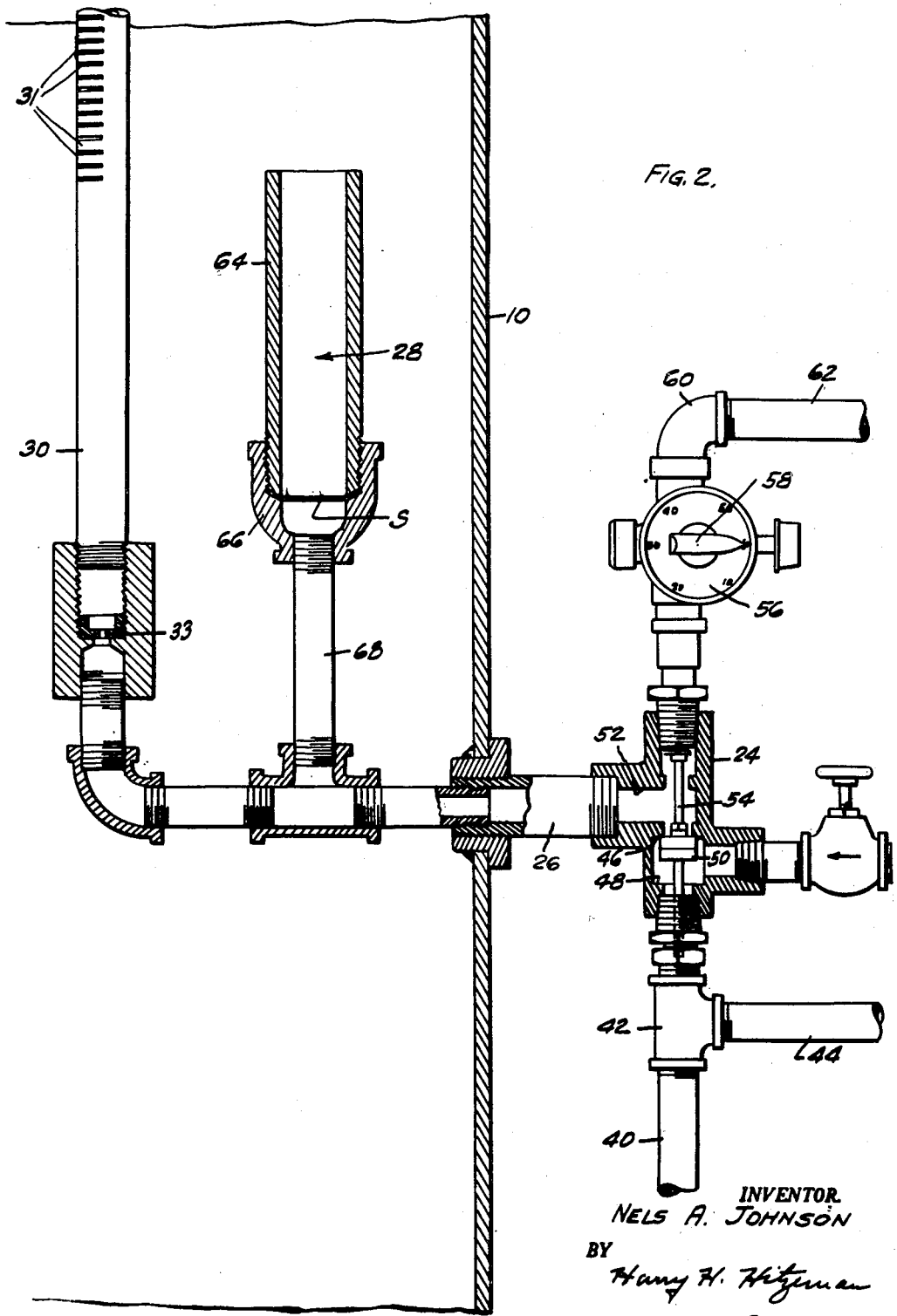

2,905,325

AUTOMATIC WATER SOFTENER

Nels A. Johnson, Palatine, Ill.

Application August 1, 1955, Serial No. 525,454

3 Claims. (Cl. 210—275)

My invention relates to an automatic water softener or similar device.

My invention relates more particularly to a device of the type described that is self-regenerating, which process is necessary in water softeners at certain intervals.

The minerals used for water softeners must be regenerated at certain intervals depending upon the water being used and the amount that is treated. The regeneration generally consists of introducing salt into the top of the softener tank and then reversing the flow of water through the tank, that is, introducing hard water through the bottom of the tank to raise it to the top of the tank. This permits the salt introduced to drop down through the mineral bed. From the action of water softening, the minerals employed extract calcium and magnesium from the hard water, becoming coated therewith in the process. The salt has a chemical action on this coating and dissolves the same, leaving the water softening minerals in a sodium state. The salt is dissolved and flowed up and off through the discharge outlet to a drain carrying the calcium and magnesium deposits away.

The principal object of the present invention is to provide water softening apparatus which is capable of automatic action to regenerate the mineral bed therein at certain intervals, said regenerating action being accomplished by the operation of a timing valve which causes a reversal of the flow of water through the water softener tank.

A further object of the invention is to provide in connection with the automatic valve, an overflow or spill member in the tank so that the time consumed in regeneration may be accelerated, with the result that a minimum of time and non-use of soft water is required.

A further object of the invention is to provide a water softener of the type described wherein the overflow unit which automatically cuts off the flow of water to drain, is self-closing after each regenerating operation, yet capable of reopening automatically upon the inception of another regenerating cycle.

Other objects and advantages will be more apparent from the following description wherein reference is had to the accompanying drawings, upon which:

Fig. 1 is a vertical sectional view of a water softening apparatus embodying the features of my invention, parts thereof being shown in section to more clearly show other parts; and Fig. 2 is an enlarged fragmentary sectional view of a portion of the tank, the control valves and the overflow unit.

In the embodiment of the invention which I have chosen to illustrate and describe the same, I have shown a vertically disposed cylindrical tank 10 which is provided with a semi-cylindrically shaped bottom wall 12 secured therein by welding or otherwise, and an arcuate top 14 provided with an axial or centrally disposed opening 15. The opening 15 is normally closed by means of a suitable removable cap member 16.

The tank 10 is usually about ⅔ filled, or filled to the level shown, with a water filtering mineral M, such as ion exchange or any other similar product that is well known in the art. Hard water from an outside source may be introduced through conduit 18 and shut-off valve 20 to the housing 22 of the timing valve unit 24. In normal operation, the water flows from the valve 24 through the horizontally disposed conduit 26 to the top of the tank, being discharged through either the overflow bowl 28 or a vertically disposed standpipe 30 inside the tank 10.

The water thus introduced seeps down through the mineral bed in the tank and is softened, and is withdrawn when desired by the user through the lower outlet conduit 32 connected by an elbow 34 to a conduit 36 which extends outwardly through the wall of the tank 10 where it may be connected by an elbow 38 to an upright pipe 40 that is conected to one end of a T-member 42. A soft water outlet pipe 44 extends away from one side of the T 42 to the place where the soft water is to be used.

This is the normal operation of the water softener. However, as previously pointed out, after a certain period of use, depending upon the exact type of water and the amount of water which is used, the minerals lose their efficiency in softening due to the fact that they have become coated during the process. It is therefore necessary to clean the mineral, or as is known in the art, regenerate the same. The regeneration is accomplished by removing the cap on the top of the tank and depositing a charge of salt in the top of the tank, and then reversing the flow of water through the tank to carry off the calcium and magnesium deposits.

For this purpose the valve 22 is provided with a pair of valve seats 46 and 48 and a vertically reciprocal valve member 50. In normal use the valve 50 seats upon the valve seat 48 so that hard water entering flows through the passageway 52 and conduit 26 as previously described. In regenerating, the valve 50 is moved upwardly to the valve seat 46 so that the flow of water may be downwardly through the T 42 and either through the outlet 44 or vertical pipe 40 to the bottom of the tank.

The means employed for effecting a change in the seating of the valve 50 is a commercially available timer valve which may include a valve rod 54 which carries the valve 50 and a timer unit 56 which is manually set by means of a handle 58. In regenerating, the valve 50 is moved up to the seat 46 and will stay there for the required regenerating period, the timing device 56 having a passageway therethrough and through an elbow 60 to a drain 62. During this period hard water is introduced through the bottom of the tank, and as it flows upwardly and creates an upward turbulence in the mineral bed, the level of the water will rise until it reaches the top of the cylindrical chamber 64 of the overflow bowl 28. During this condition the entire deposit of salt drops to the bottom of the tank or under the bed of minerals so that as further water is flowed upwardly it carries the salt in passing through the mineral bed, collects the calcium and magnesium deposits and carries them up and away through the overflow bowl 28. Other discharge will be through the slots 31 in the standpipe 30 and through the reduced orifice 33 at the bottom of the standpipe 30.

The overflow bowl 28 is provided with a screen member S positioned in a reducing fitting 66 which connects the upright tube 64 with a standard discharge pipe 68. After a certain period of flow through the overflow pipe 64, the screen S will gradually become clogged with salt deposits and finally close off the flow through this outlet entirely. However, water will continue to flow through the standpipe 30 and orifice 33 to discharge during the remainder of the period for which the timing valve has been set.

With the regenerating operation as above described, it can be seen that immediately upon reversing the flow of hard water, that is by introducing it into the bottom of the tank, there is a prompt intermixing and dropping of the salt to the bottom of the tank. There is then a rather heavy and steady flow of waste salt and water through the top of the overflow bowl 28 and out through the discharge 62 which accelerates the cleaning or regenerating action. When the screen S, however, becomes clogged through the settling of salt deposits on the same, and which action usually takes place toward the end of a regenerating period, there will be a further but very restricted discharge flow through the orifice 33 in the standpipe 30, and this flow will continue only until the timer valve closes the discharge 62 and opens the flow of hard water directly into the top of the tank 10. When this action takes place the flow of water into the tank at the top and upwardly through the overflow bowl 28 will flush out the screen S so that when the next regenerating action takes place the screen will be clean and ready to perform in the manner previously described.

From the above and foregoing description it can be seen that I have provided a highly efficient regenerating mechanism with a fast cycle of operation. With the overflow bowl 28 which is provided, the regenerating action is much quicker, thus shortening the length of time during which users are without soft water.

I contemplate that changes and modifications may be made in the exact details shown and I do not wish to be limited in any particular; rather what I desire to secure and protect by Letters Patent of the United States is:

1. In a water conditioning and filtering unit including a tank having a bed of ion exchange materials for conditioning raw or untreated water and provided with a lower outlet conduit in the lower portion of the tank, a vertically disposed standpipe in the upper portion of the tank, a horizontally disposed inlet conduit connected to said vertically disposed standpipe at its lower end, said standpipe being disposed medially of said tank, an upright tube connected to said inlet conduit in said tank between the tank wall and said standpipe, an overflow bowl connected to the upper end of said upright tube, and a screen in the lower end of said bowl, said vertical standpipe and said bowl providing conduits through which the raw or untreated water enters prior to passage downwardly through the bed of ion exchange materials, said standpipe and bowl also providing a passage for the discharge of the effluent when backwashing the ion exchange materials by passing water upwardly through the bed of materials from the lower outlet conduit to loosen, cleanse and stratify these materials, said screen adapted to gradually become clogged with ion exchange deposits during this operation to finally close off the flow through the bowl.

2. In a water conditioning and filtering unit including a tank having a bed of ion exchange materials for conditioning raw or untreated water and provides with a lower outlet conduit in the lower portion of the tank, a vertically disposed standpipe in the upper portion of the tank, a horizontally disposed inlet conduit connected to said vertically disposed standpipe at its lower end, said standpipe being disposed medially of said tank, an upright tube connected to said inlet conduit in said tank between the tank wall and said standpipe, an overflow bowl connected to the upper end of said upright tube, and a screen in the lower end of said bowl, said vertical standpipe and said bowl providing conduits through which the raw or untreated water enters prior to passage downwardly through the bed of ion exchange materials, said standpipe and bowl also providing a passage for the discharge of the effluent when backwashing the ion exchange materials by passing water upwardly through the bed of materials from the lower outlet conduit to loosen, cleanse and stratify these materials, said screen adapted to gradually become clogged with ion exchange deposits during this operation to finally close off the flow through the bowl, said standpipe having a vertically disposed row of slots therein adjacent the upper end of the same.

3. In a water conditioning and filtering unit including a tank having a bed of ion exchange materials for conditioning raw or untreated water and provided with a lower outlet conduit in the lower portion of the tank, a vertically disposed standpipe in the upper portion of the tank, a horizontally disposed inlet conduit connected to said vertically disposed standpipe at its lower end, said standpipe being disposed medially of said tank, an upright tube connected to said inlet conduit in said tank between the tank wall and said standpipe, an overflow bowl connected to the upper end of said upright tube, and a screen in the lower end of said bowl, said vertical standpipe and said bowl providing conduits through which the raw or untreated water enters prior to passage downwardly through the bed of ion exchange materials, said standpipe and bowl also providing a passage for the discharge of the effluent when backwashing the ion exchange materials by passing water upwardly through the bed of materials from the lower outlet conduit to loosen, cleanse and stratify these materials, said screen adapted to gradually become clogged with ion exchange deposits during this operation to final'y close off the flow through the bowl, said standpipe having a vertically disposed row of slots therein adjacent the upper end of the same, and said standpipe having a reduced orifice adjacent its connection to the horizontally disposed inlet conduit.

References Cited in the file of this patent

UNITED STATES PATENTS

| | | |
|---|---|---|
| 2,627,503 | Anderson | Feb. 3, 1953 |
| 2,636,560 | Rogers | Apr. 28, 1953 |
| 2,670,328 | Webb | Feb. 23, 1954 |
| 2,689,006 | Lindsay | Sept. 14, 1954 |